Jan. 27, 1931.  H. P. GORMAN  1,790,539
FRICTION GEARING
Filed Sept. 10, 1927

WITNESSES
F. R. Harris.
Hugh H. Ott

INVENTOR
Horace P. Gorman
BY
Munn & Co.
ATTORNEY

Patented Jan. 27, 1931

1,790,539

UNITED STATES PATENT OFFICE

HORACE P. GORMAN, OF RYE, NEW YORK

FRICTION GEARING

Application filed September 10, 1927. Serial No. 218,821.

This invention relates to power transmission and has particular reference to an improvement in friction gears and gearing.

The invention comprehends an improvement in friction gears and gearing which primarily prevents strains on the parts connected, by allowing for a predetermined amount of slip before the gears grip, this being especially desirable where a high speed universal type of motor is used from which it is intended to step down the speed by means of the gearing.

The invention furthermore contemplates a friction gearing in which axial engagement of the gears is effected in lieu of peripheral contact, whereby the drive and driven gears provide a slight drag to make for higher efficiency in operation.

Other objects reside in the simplicity of construction of the gears, the economy with which the same may be produced, and the general efficiency derived therefrom.

With the above recited and other objects in view, reference is had to the following description and accompanying drawings in which there is exhibited one example or embodiment of the invention, while the appended claims define the actual scope of the invention.

In the drawings—

Figure 1:
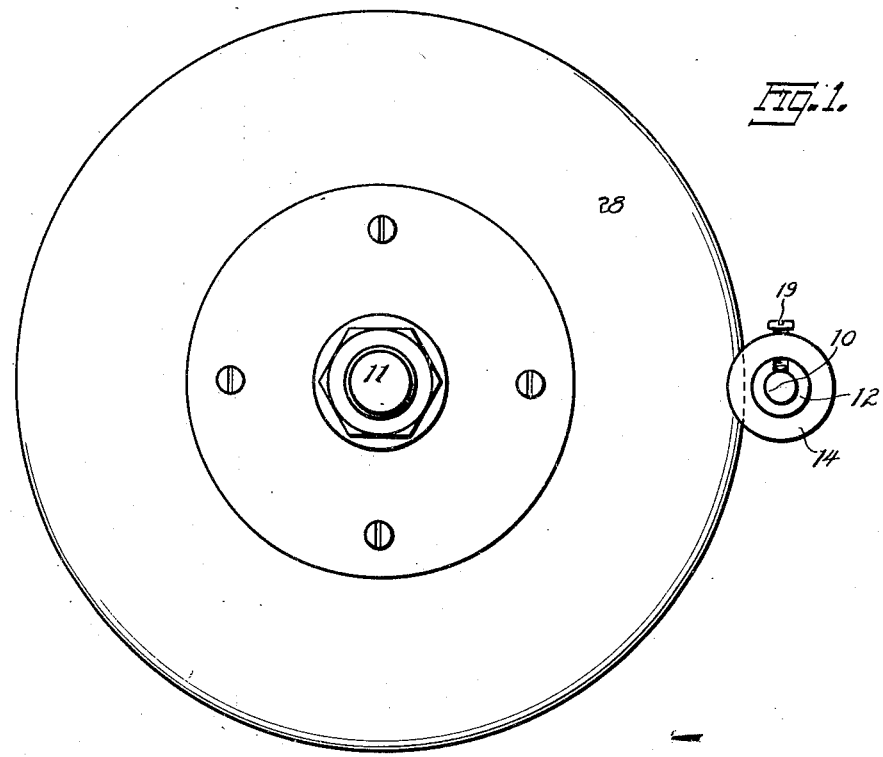
Figure 1 is a side view of the gearing illustrating the gears in active engagement.
Figure 2:
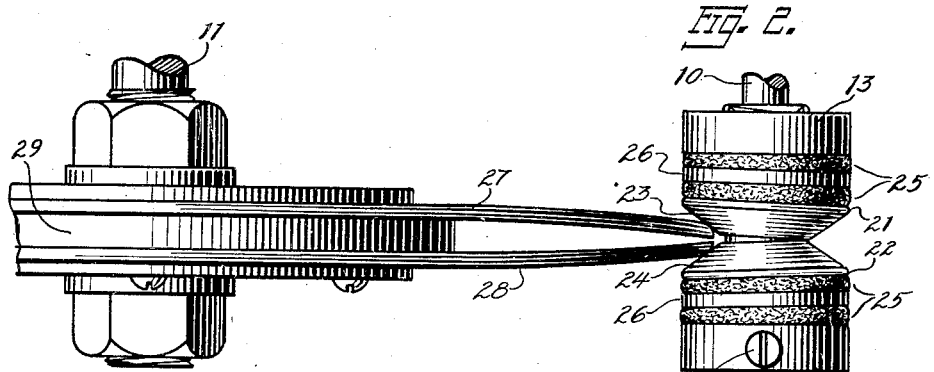
Fig. 2 is an edge view thereof.
Figure 3:
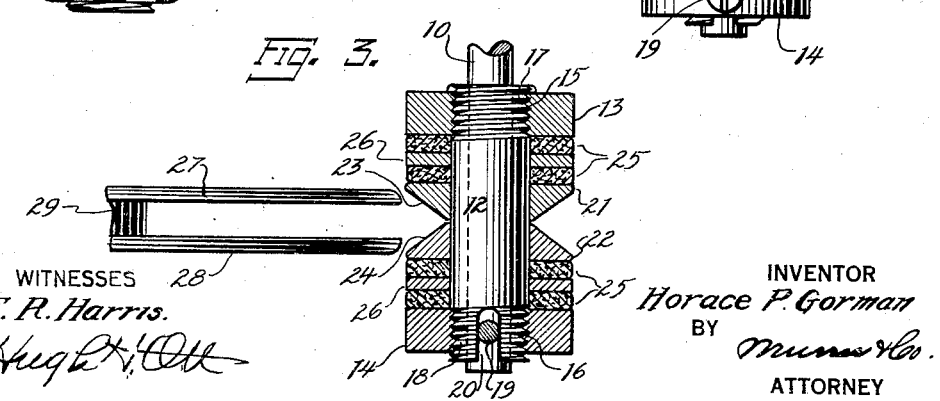
Fig. 3 is a similar view with parts in section and illustrating the gears out of contact.

Referring to the drawings by characters of reference, 10 and 11 designate a pair of parallel shafts which are adapted to be driven by means of a gearing constituting the present invention. The gear attached to the shaft 10 preferably includes a tubular hub or axis member 12, upon the opposite ends of which are mounted for axial adjustment, abutment elements 13 and 14. The abutment elements are preferably axially adjustable by interior internal threads 15 and 16 which are, respectively, threadedly engaged on the threaded opposite ends 17 and 18 of the hub. The hub may be keyed to the shaft 10 in any desired manner, such as by means of a set screw 19, which extends through the abutment element 14 and a slot 20 in the hub end. Loosely mounted on the hub 12 are a pair of rim members 21 and 22 having confronting beveled faces 23 and 24 which diverge radially to provide a V-shaped groove. Means is arranged on the hub and interposed between each rim member and abutment element for normally urging beveled faces of the rim members toward each other and for tensioning the same against relative axial separation. In the preferred embodiment of the invention, this means consists of alternately arranged disks or washers 25 and 26 of a yieldable and non-yieldable nature.

While the gear thus described as carried by the shaft 10 may co-operate with a gear on the shaft 11 of any suitable nature, it is preferable to employ on the shaft 11 a gear composed of axially spaced disks 27 and 28 which are spaced on the shaft by means of a spacer element 29 of considerably lesser diameter than the disks 27 and 28 so that the peripheral portions of said disks 27 and 28 are capable of deflection toward each other as they engage within the groove defined by the confronting beveled faces 23 and 24 of the rim members 21 and 22 of the other gear. It is, of course, understood that the shafts and gearing are mounted for relative movement toward and away from each other to bring the same into or out of active contact.

In operation, when the peripheries of the disks 27 and 28 are forced into engagement with the beveled faces 23 and 24, a relative axial separation of the rim members 21 and 22 is effected, which, at the same time, tends to slightly cant the members 21 and 22, thereby squeezing the yieldable washers or disks 25 slightly out of shape to cause the parts to grip and turn with the shafts. At the same time, the peripheries of the disks 27 and 28 at the point of contact will be deflected inwardly as illustrated.

The initial contact of the gears will allow for a slight slip before actual gripping is set up, thereby preventing strain on the connected parts.

What is claimed is:—

1. In a friction gearing, a gear, including a shaft, a pair of longitudinally spaced abutment elements carried by said shaft, a pair of axially movable, relatively separable rim members loosely mounted on said shaft, having beveled faces diverging radially and between which a second gear is adapted to engage for spreading and canting the rim members to cause the same to set up a frictional driving connection with the shaft, and means on said shaft and interposed between each rim member and abutment element for normally urging the beveled faces of said rim members toward each other and for tensioning the same against relative axial separation.

2. In a friction gearing, a gear including a hub, a pair of longitudinally spaced abutment elements thereon, a pair of axially movable, relatively separable rim members loosely mounted on said hub, said rim members having confronting beveled faces diverging radially to define a V-shaped groove, and alternately arranged yieldable and unyieldable disks on said hub interposed between each rim member and abutment element, whereby a second gear engaged between the beveled faces of the rim members will spread and cant the same to set up a frictional driving connection between said members, the disks and the abutment elements.

3. In a friction gearing, a gear including a hub, a pair of longitudinally spaced abutment elements axially adjustable thereon, a pair of axially movable, relatively separable rim members loosely mounted on said hub, said rim members having confronting beveled faces diverging radially to define a V-shaped groove and alternately arranged yieldable and unyieldable disks on said hub interposed between each rim member and abutment element, whereby a second gear engaged between the beveled faces of the rim members will spread and cant the same to set up a frictional driving connection between said members, the disks and the abutment elements.

4. In a friction gearing, a gear including a hub, a pair of longitudinally spaced abutment elements threadedly mounted on said hub for axial adjustment, a pair of axially movable, relatively separable rim members loosely mounted on said hub, said rim members having confronting beveled faces diverging radially to define a V-shaped groove, and alternately arranged yieldable and unyieldable disks on said hub interposed between each rim member and abutment element, whereby a second gear engaged between the beveled faces of the rim members will spread and cant the same to set up a frictional driving connection between said members, the disks and the abutment elements.

5. In a friction gearing, a gear including a hub, a pair of longitudinally spaced abutment elements thereon, a pair of axially movable, relatively separable rim members loosely mounted on said hub, said rim members having confronting beveled faces diverging radially to define a V-shaped groove, and means arranged on said hub and interposed between each rim member and abutment element for normally urging the beveled faces of said rim members toward each other and for tensioning the same against relative axial separation, whereby a second gear engaged between the beveled faces of the rim members will spread and cant the same to set up a frictional driving connection between said members, said means and the abutment elements.

6. In a friction gearing a pair of parallel shafts to be operatively connected, a gear on one shaft including a pair of axially spaced disks, the peripheral portions of which are capable of deflection, a gear on said second shaft comprising a pair of longitudinally spaced abutment elements, a pair of axially movable, relatively separable rim members, loosely mounted on said second shaft and having confronting beveled faces diverging radially for the reception therebetween of the peripheral portion of the first-mentioned gear, and means arranged on said second shaft and interposed between each rim member and abutment element for normally urging the beveled faces of said rim members toward each other and for tensioning the same against relative axial separation.

7. In a friction gearing a pair of parallel shafts to be operatively connected, a gear on one shaft including a pair of axially spaced disks, the peripheral portions of which are capable of deflection toward each other, a gear on said second shaft comprising a pair of longitudinally spaced abutment elements, a pair of axially movable, relatively separable rim members loosely mounted on said second shaft and having confronting beveled faces diverging radially for the reception therebetween of the peripheral portion of the first-mentioned gear, and means arranged on said second shaft and interposed between each rim member and abutment element for normally urging the beveled faces of said rim members toward each other and for tensioning the same against relative axial separation.

8. A friction gear including an axis member, a pair of longitudinally spaced abutment elements on said axis member, and a pair of axially movable relatively separable normally engaged rim members loosely mounted on said axis member for canting movement and having confronting beveled faces diverging radially.

Signed at New York in the county of New York and State of New York this 9th day of September, A. D. 1927

HORACE P. GORMAN.